G. N. GIVENS.
GATE.
APPLICATION FILED OCT. 6, 1919.
1,370,534.
Patented Mar. 8, 1921.
3 SHEETS—SHEET 3.
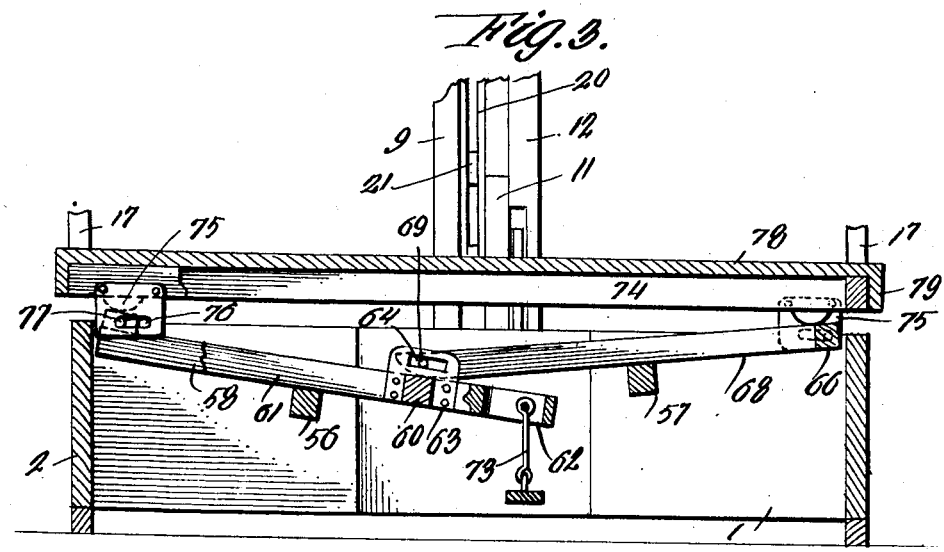
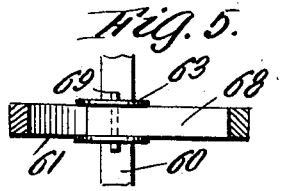
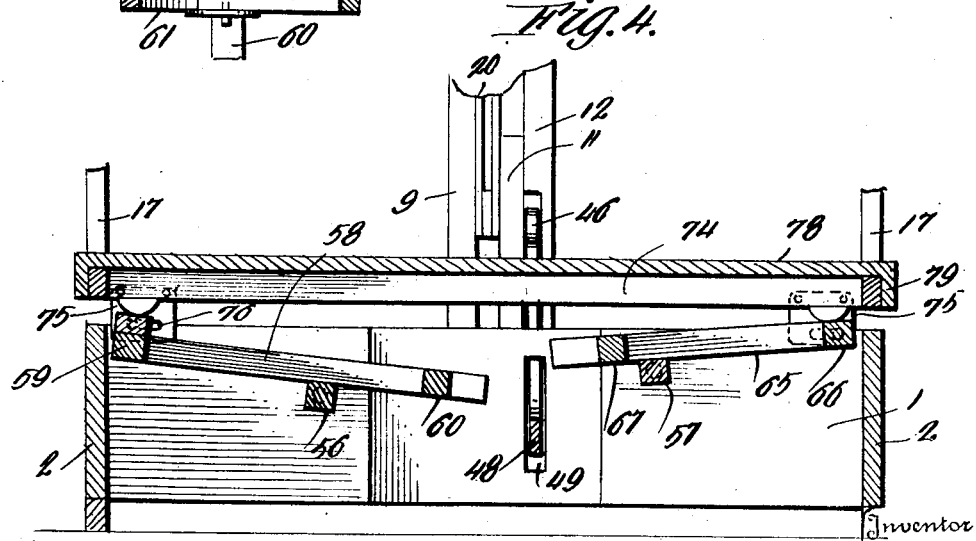
WITNESSES
Guy M. Spring
J. P. Campbell
Inventor
GEORGE N. GIVENS
By Richard B. Owen
Attorney

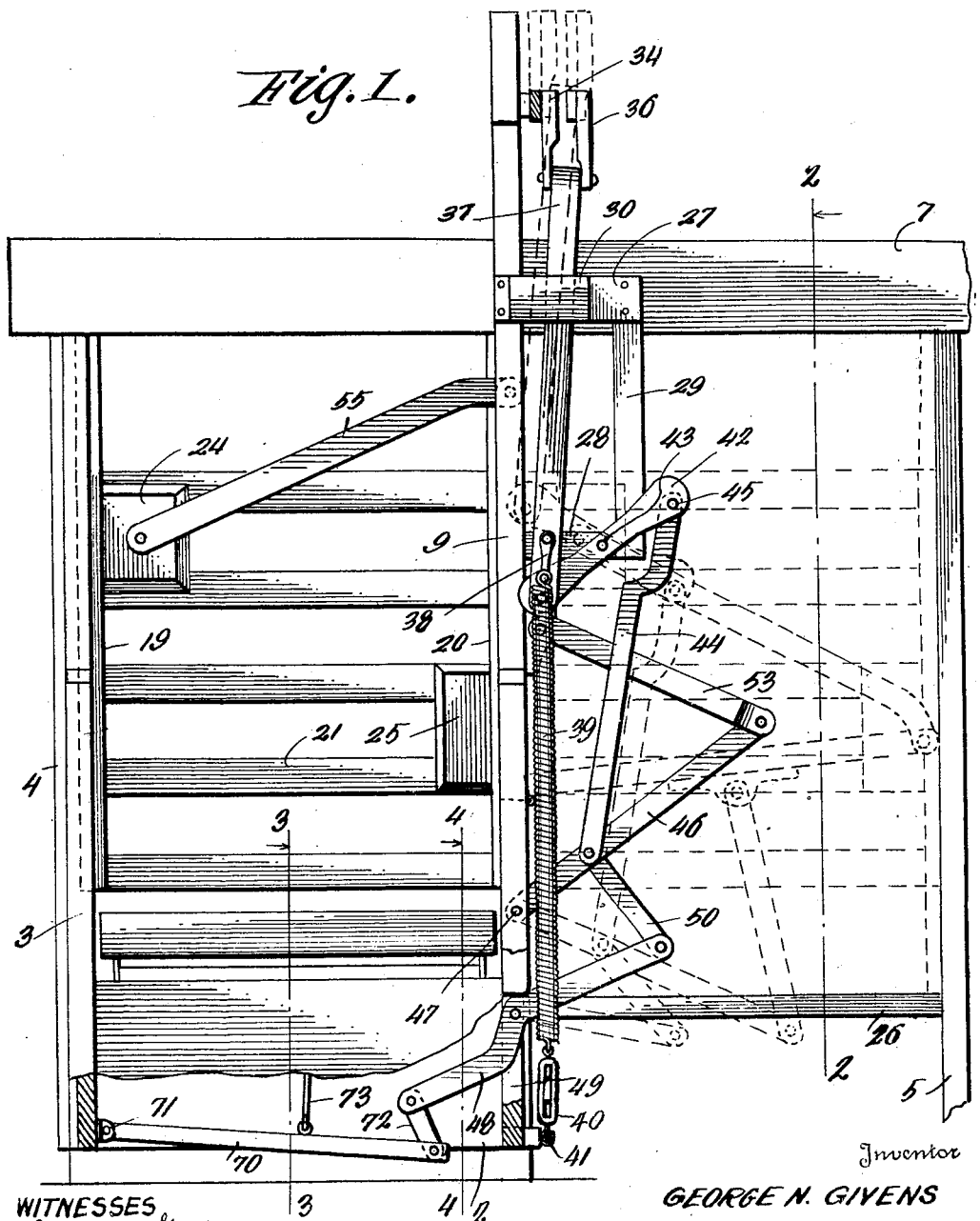

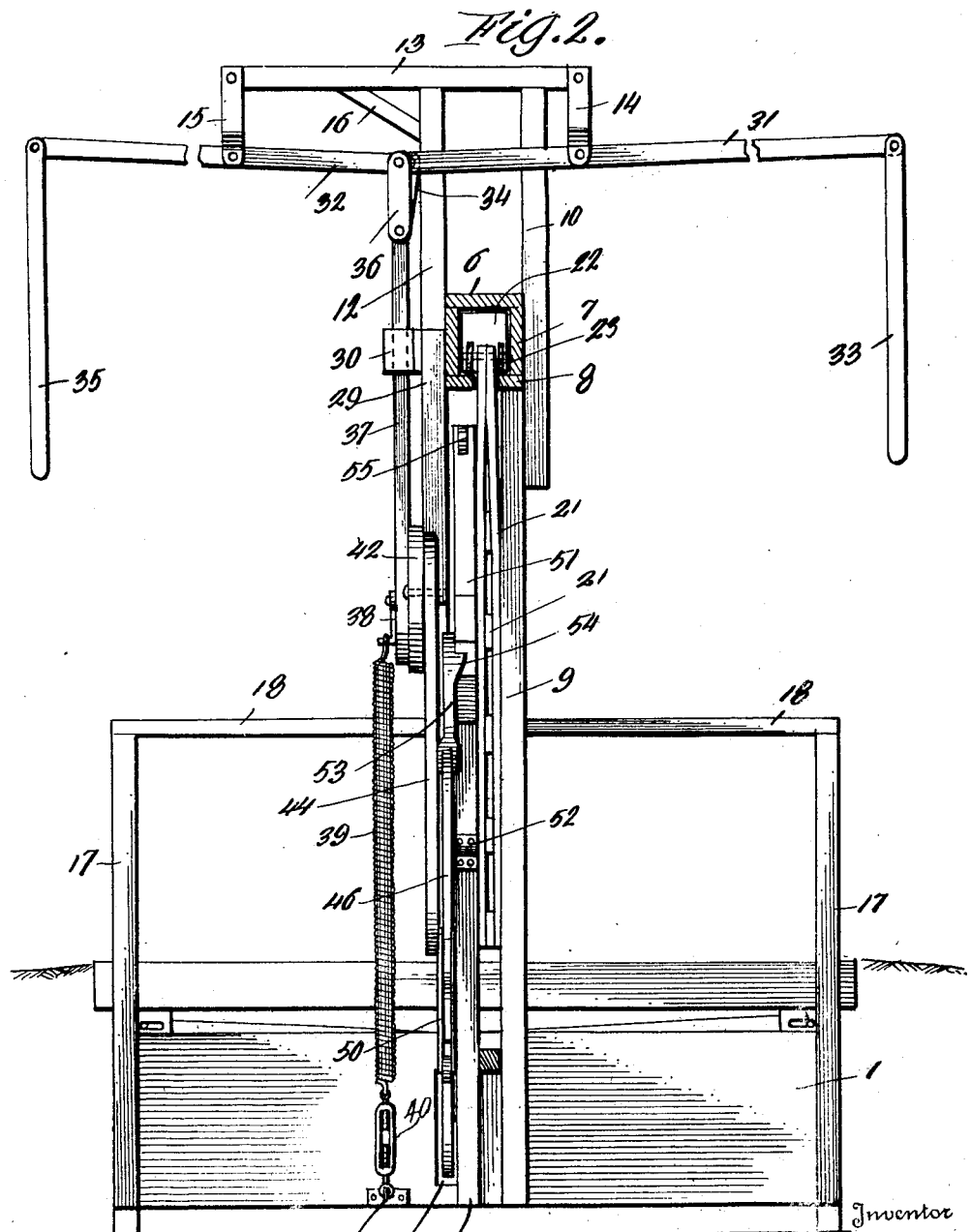

UNITED STATES PATENT OFFICE.

GEORGE NEWTON GIVENS, OF PINEVILLE, LOUISIANA, ASSIGNOR OF TWO-FIFTHS TO JOHN B. ROBERTS, OF COLFAX, LOUISIANA.

GATE.

1,370,534.   Specification of Letters Patent.   Patented Mar. 8, 1921.

Application filed October 6, 1919. Serial No. 328,707.

*To all whom it may concern:*

Be it known that I, GEORGE N. GIVENS, a citizen of the United States, residing at Pineville, in the parish of Rapides and State of Louisiana, have invented certain new and useful Improvements in Gates, of which the following is a specification.

My invention relates to new and useful improvements in gates and more particularly to means for opening and closing the gate.

The principal object of the invention resides in the provision of means for operating the gate by over-head levers or by the weight of a vehicle passing over a platform.

Another object of the invention consists in a novel arrangement of levers whereby the gate may be opened by over-head levers and automatically closed when the levers are released.

A further object consists in the construction of a novel form of platform whereby the gate may be opened by a vehicle engaging either end of the platform and the gate will be closed when the vehicle leaves the opposite side of said platform.

Still another object of the invention resides in the provision of novel means for supporting the gate so that it may be easily slid to assume either an open or a closed position.

With these and other objects in view my invention consists of the novel details of construction and arrangement of parts which will be more clearly understood from the following specification and drawings in which:—

Figure 1 is a side elevation showing the gate in closed position.

Fig. 2 is a vertical section on the line 2—2 of Fig. 1 looking in the direction of the arrows.

Fig. 3 is a vertical section on the line 3—3 of Fig. 1 looking in the direction of the arrow.

Fig. 4 is a vertical section on the line 4—4 of Fig. 1 looking in the direction of the arrow, and Fig. 5 is a top plan of the means or plates for connecting the two sections of the platform operated levers.

In carrying out my invention I provide a base which is composed of side rails 1 and end plates or rails 2. This base is adapted to be embedded in the ground as is more particularly illustrated in Fig. 2 of the drawings. To one of the side rails 1, of the base, are connected the spaced uprights 3 which have a vertical plate 4 secured to the outer face thereof for a purpose to be later described. Spaced uprights 5 are supported upon the ground, in spaced relation to the base and these spaced uprights 5 are of the same height as the uprights 3 and in alinement therewith. The uprights 3 and 5 are connected at their upper ends by a housing which forms a track for suspending a gate to be later described. This housing comprises a top plate 6, side rails 7, and bottom strips or plates 8. The bottom strips or plates 8 are of such a width as to leave a longitudinally extending space between their inner edges and these strips or plates 8 form tracks for supporting the gate to be later described. An upright 9 is secured to the side plate or rail 1, of the base, opposite to the one having the uprights 3 secured thereto, and this upright 9 is of the same height as the uprights 3 and engages under one of the strips 8 of the housing. The uprights 3 and 9 are connected to the side rails 1 intermediate their ends as is more particularly illustrated in Fig. 2 of the drawings. A vertically extending post or strip 10 is secured to the upper end of the upright 9 and engages one of the side plates 7 of the housing as more particularly illustrated in Fig. 2 of the drawings. The purpose of this post or strip 10 will be later described. A post 11 is secured to the side rail 1 of the base adjacent the upright 9 and in spaced relation thereto. An upright 12 is secured to the outer face of this post 11 and extends upwardly to the same height as the post 10 secured to the upright 9. A horizontal bar 13 is secured to the upper ends of the post 10 and upright 12 and has the depending members 14 and 15 secured to the opposite ends thereof. A brace 16 is secured to the upright 12, adjacent the upper end thereof, and engages under the longer arm of the bar 13 for aiding in supporting the same.

Posts 17 are secured to each corner of the base and rails 18 are secured to the upper ends of these posts and extend to the uprights 3, 9, and 12.

A gate is supported from the tracks 8 and comprises the vertical end pieces 19 and 20 connected by vertically spaced horizontal bars or strips 21. The end pieces 19 and 20 extend upwardly through the longitudinally extending opening formed by the tracks 8 and the upper ends of these end pieces 19 and 20 are secured in blocks 22 which operate between the side rails 7 of the housing. Wheels 23 are rotatably mounted in the under side of the blocks 22 and engage the upper surface of the tracks 8. A plate 24 is secured to one side of the gate, adjacent one upper forward corner and the plate 25 is secured to one face of the gate adjacent the rear edge and intermediate the top and bottom. The purpose of this plate will be later described. A bar 26 is connected adjacent the lower ends of the uprights 5 and the opposite end is connected between the upright 9 and post 11 adjacent the lower ends thereof.

As is shown in Fig. 1 of the drawings, in full lines the gate when closed will lie between the uprights 3 and uprights 9 and 12. When in closed position the forward end of the gate will engage the vertical strip or plate 4 secured to the outer face of the uprights 3. When open the gate will assume the position indicated in dotted lines in Fig. 1 and will lie between the uprights 5 and uprights 9 and 12.

Arms 27 and 28 are secured to the upright 12, intermediate the ends thereof, and are vertically spaced as more particularly illustrated in Fig. 1 of the drawings. A vertical strip 29 connects the outer ends of the arms 27 and 28. A guide 30 is secured to the outer face of the arm 27 and is provided with a vertically extending elongated opening for a purpose to be later described.

A lever 31 is pivotally connected to the depending member 14 and a similar lever 32 is pivotally connected to the depending member 15. A handle 33 is pivotally connected to the outer end of the lever 31 and a link 34 is secured to the inner end of the lever. A handle 35 is pivotally connected to the outer ends of the lever 32 and a link 36 is pivotally connected to the inner ends of the lever. A vertically extending bar 37 extends through the elongated opening of the guide 30 and has its upper end secured to and between the links 34 and 36. A hook 38 is secured to the lower end of the bar 37 and is adapted to have one end of a coiled spring 39 connected thereto. The opposite end of the coil spring is connected to a turn buckle 40 which in turn is secured to a hook 41 connected to the side of the base. This coil spring 39 will normally hold the bar 37 in lowered position and upon pulling down the handles 33 or 35 the bar 37 will be raised against the tension of the spring. The elongated opening in the guide 30 will allow the bar 37 to swing slightly.

An arm 42 is pivotally connected to the arm 28 at 43. The inner end of the arm 42 is pivotally connected to the lower end of the bar 37 and a bar 44 is pivotally connected to the opposite end of the arm 42 at 45 and extends downwardly therefrom. A link 46 is pivotally connected to the upright 12 at 47 and the lower end of the bar 44 is connected to the link 46 intermediate the ends thereof. A lever 48 is pivotally connected to the side of the post 11 and extends through an opening 49 formed in the side of the base. The outer end of the lever 48 is connected to the link 46 by a link 50.

An arm 51 is hingedly connected to the top of the post 11 at 52 and normally lies between the edge of the gate and the upright 12. A link 53 has one end secured to the arm 51 and the opposite end is secured to the end of the link 46. This link 53 is provided adjacent its upper or inner end with a shoulder 54 which engages over the outer edge of the arm 51.

A bar 55 has one end pivotally connected to the outer end of the arm 51 and the opposite end is pivotally connected to the plate 24 secured to the upper forward corner of the gate.

The construction so far described has reference to the means for operating the gate through means of over-head levers. When the gate is closed the parts will be in positions illustrated in full lines in Fig. 1 of the drawings. When the gate is to be opened one of the depending handles 33 or 35 is grasped and by pulling downwardly thereon either the lever 31 or 32 will be swung to draw the inner end thereof upwardly. This movement will draw the bar 37 upwardly and this in turn will raise the inner end of the lever 42 and lower the outer end thereof. The connecting bar 44 will be lowered thereby pressing down on the link 46. The outer end of the link 46 will draw the link 53 downwardly and thereby swing the arm 51 on its hinge 52. The bar 55 will swing with the arm 51 and thereby draw the gate through the uprights 9 and 12. The gate being hung upon the rollers 23 will easily slide on the tracks 8. When the handles 33 or 35 are disengaged the coiled spring 39 will draw down on the bar 37 and thereby return the several parts to their original position and the gate to closed position. The downward movement of the link 46 will also press the link 50 downwardly and swing the lever 48 on its pivot for a purpose to be later described.

For operating the gate by the weight of a vehicle I provide a suitable operating mechanism within the base. Cross bars 56 and 57 are pivotally mounted in the base between the side rails 1. As shown more particularly in Figs. 3 and 4 of the drawings these bars 56 and 57 are spaced from the upper edge of the side rails 1 and also spaced from the ends 2. The cross bar 56 is in a plane lower than the cross bar 57 for a purpose to be later described. Side bars 58 are secured to the top of the cross bar 56 and these bars 58 are connected at their outer ends by a cross bar 59 and at their inner ends by a cross bar 60. A longitudinally extending bar 61 is secured to the cross bar 56 between the side bars 58 and is provided adjacent its inner end with an elongated opening 62. Plates 63 are secured to each side of this longitudinally extending bar 61 and straddle the cross bar 60 as more particularly illustrated in Fig. 3 of the drawings. These plates 63 are provided with elongated openings 64 for a purpose to be later described. Side bars 65 are secured to the upper surface of the pivoted cross bar 57 and a cross bar 66 connects the side bars adjacent their upper ends. A cross bar 67 connects the side bars 65 adjacent their lower ends. A longitudinally extending bar 68 is secured between the side bar 65 and the inner end thereof is received between the plates 63 secured to the bar 61. A transverse pin 69 is secured to the inner end of the longitudinal bar 68 and operates in the elongated openings 64 in the plates. A treadle 70 is pivotally connected at 71 to one of the side rails 1 of the base and the opposite end is connected to the inner end of the lever 48 by a link 72. A rod 73 connects the inner end of the bar 61 and the treadle 70 at a point intermediate the ends of said treadle.

A frame denoted generally at 74 is adapted to be supported by the cross bars 59 and 66. Plates 75 are secured to the sides of the frame and each plate is provided with an elongated opening 76 to receive pins 77 secured to the ends of the cross bars 59 and 66. A platform 78 is supported upon the frame 74 and is provided with a downwardly extending flange 79 which is adapted to surround the frame. The platform 78, as well as its supporting frame is received between the uprights 3, 9, and 12.

When the gate is closed the platform will be supported in the position illustrated slightly below the lower edge of the gate and in alinement with the upper surface of the ground in which the base is embedded. When the vehicle engages one end of the platform it will lower that end of the frame 74 which in turn will depress either the cross bars 59 or 66. This will raise the outer ends of the longitudinal bars 61 or 68 which in turn will draw upwardly on the rods 73. This will swing the outer end of the treadle 70 upwardly and raise the link 72 and inner end of the lever 48. This will draw down on the outer end of the lever 48 and operate the gate through means of the links, levers, arms, and bars described for operating the gate by hand.

From the above detailed description of my invention it will be noted that I have provided a gate which may be operated by hand, through means of over-head levers, or which may be operated automatically by a vehicle going in either direction.

The foregoing description and accompanying drawings have reference to what might be considered to be the approved, or preferred, form of my invention. I desire it to be understood that I may make such changes in construction, combination and arrangement of parts, materials, dimensions, et cetera, as may prove expedient and fall within the scope of the appended claims.

Having fully described my invention what I claim as new and desire to secure Letters Patent for is:—

1. In combination with a frame, a gate slidable in the frame, levers pivotally connected to the frame, a vertically adjustable bar connected to the levers, means connecting the adjustable bar and gate, a hook provided upon the lower portion of said adjustable bar, a coil spring connected to the lower portion of said frame at one end and having its other end in engagement with said hook for pulling said adjustable bar to a lowered position thus causing said gate to move to or remain in a closed position.

2. In a device of the class described, a frame, a gate slidable in the frame, a bar having one end pivotally connected to the other end of the gate, an arm hingedly connected to the bottom of the frame and having its upper end connected to the other end of the bar, a pair of links pivotally connected at one end, one of said links pivotally connected to the frame beneath the pivotal connection of the arm and the frame, the other link pivotally connected to the arm intermediate its ends, a third link having one end pivoted to the first link intermediate its ends and means for pulling and pushing the third link so as the gate will slide in the frame.

3. In a device of the class described, a frame, a pair of vertically extending standards in said frame, a gate slidably mounted in the frame and through said standards, a bar having one end pivotally connected to the outer end of the gate, an arm hingedly connected to the bottom of the frame so as to extend between the standards and parallel therewith when the gate is closed and having its upper end pivotally connected to the other end of the bar, and means for actuating the arm upon its hinged connection so as to slide the gate in the frame.

In testimony whereof I affix my signature in presence of two witnesses.

GEORGE NEWTON GIVENS.

Witnesses:
L. L. ROACH,
W. C. CARNAHAN.